United States Patent [19]

Biesemeyer

[11] Patent Number: 5,249,633
[45] Date of Patent: Oct. 5, 1993

[54] FIELD BREAKING IMPLEMENT

[76] Inventor: Robert R. Biesemeyer, 3000 S. Hancock Hill Rd., Rocheport, Mo. 65279

[21] Appl. No.: 884,203

[22] Filed: May 18, 1992

[51] Int. Cl.$^5$ .............................................. A01B 49/02
[52] U.S. Cl. .................... 172/196; 172/193; 172/699
[58] Field of Search ............... 172/193, 194, 195, 196, 172/382, 699, 700, 722

[56] References Cited

U.S. PATENT DOCUMENTS

| | | | |
|---|---|---|---|
| 15,649 | 9/1856 | Harris | 172/700 |
| 21,975 | 11/1858 | Mahen | 172/700 |
| 80,113 | 7/1868 | Ballard | 172/382 X |
| 108,485 | 10/1870 | Johnson | 172/700 X |
| 137,894 | 4/1873 | Cotten | 172/700 |
| 755,178 | 3/1904 | Simmons | 172/194 |
| 756,849 | 4/1904 | Gwynes | 172/700 |
| 1,623,530 | 4/1927 | Dominick | 172/193 |
| 2,569,556 | 10/1951 | Collns et al. | 172/700 |
| 3,289,771 | 12/1964 | Bennett | 172/155 |
| 4,024,921 | 5/1977 | Tibbs, II | 172/146 |
| 4,336,844 | 6/1982 | Helbig et al. | 172/700 |

FOREIGN PATENT DOCUMENTS 439367 9/1948 Italy ................................. 172/196

OTHER PUBLICATIONS

John Deere, Rippers, Bedders and Toolbars Catalogue.
DMI, Inc., Tiger-Two Disk promotional flyer.
Liedner, John, Rip into Action Against Soil Compaction, Progressive Farmer, Feb., 1992, pp. 44–45.

*Primary Examiner*—David H. Corbin
*Assistant Examiner*—Spencer Warnick
*Attorney, Agent, or Firm*—Kokjer, Kircher, Bowman & Johnson

[57] ABSTRACT

A field breaking or tilling implement. The implement is mounted or located at a lower end of a shank which is adapted to be drawn behind a tractor. At the lower forward end of the shank is located a chisel point adapted to be pulled through the soil at a position just below a sub-surface hard pan soil layer. Extending rearwardly from the shank is a plow extension which mounts a plow member in spaced relation from the shank. The plow member is located directly behind the chisel, and serves to lift and break the soil. A method of tilling is also disclosed in which a plow member is pulled through the soil directly behind a chisel member.

17 Claims, 1 Drawing Sheet

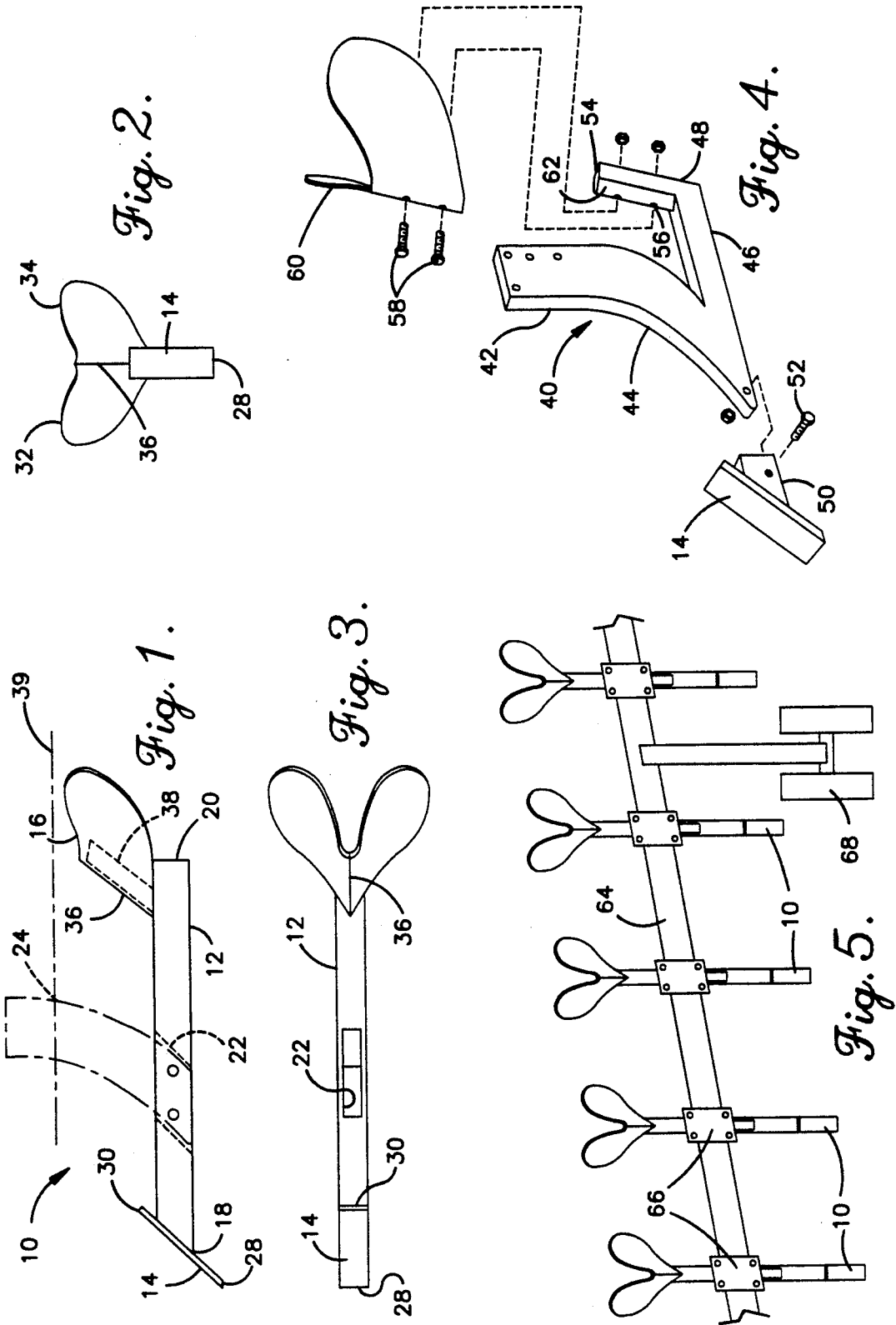

FIELD BREAKING IMPLEMENT

BACKGROUND OF THE INVENTION

1. Field of the Invention

The present invention relates in general to agricultural implements. In particular, the present invention relates to an improved soil tilling, breaking and turning implement.

2. Description of the Related Art

Rain, livestock, and farm equipment, such as tractors and trucks, are known to cause compaction of soil in fields. This compaction results in a layer of "hard pan" or highly compacted soil a few inches below the surface of the soil, with the hard pan extending for several inches downward. Below the hardpan, the soil is of a typical, lesser, density. It is very difficult for water or crop roots to pass through the layer of hard pan, which results in stunted crop growth. It has long been known to increase per acre yields by the use of tilling, which serves to break up this layer of hard pan, allowing crop roots to pass deeper into moisture laden and mineral rich soil.

One simple form of tilling employs mounting a chisel point upon a downwardly depending shank which is curved in a forward direction. The chisel point and shank are driven into the soil until the chisel point is just below the level of hard pan. The shank and chisel point are then pulled through the soil by a tractor, breaking hard pan in the area through which the shank travels. While this arrangement typically is performed with several laterally spaced shanks and chisels, the hard pan is of sufficient hardness that this method usually results in forming channels through the hard pan for each shank, while the hard pan between shanks remains in solid condition. This method also leaves distinct furrows within the soil.

Various modifications to this basic implement have been made in attempts to achieve greater breakage of the hard pan and to additionally providing turning of the soil such that organic material may be well mixed therein to promote decomposition. Such modifications typically employ one or more plow members. For example, it has been known to place plow elements on the forward edge of the shank just above the chisel, or at the sides of the shank at a point above the chisel, as shown in U.S. Pat. No. 4,336,844 to Helbig, et al.

It has also been known to provide an additional row or rows of shanks located behind the chisel shanks, with these rearward shanks carrying the plow members, as shown in U.S. Pat. No. 3,289,771 to Bennett and U.S. Pat. No. 4,024,921 to Tibbs II. In those arrangements employing rearwardly mounted plow elements, the plow elements are laterally offset with respect to the chisel shank, such that the plow elements serve to break the soil between the chisel furrows and turn or move this soil into the furrows left by the chisels.

While these arrangements provide adequate tillage, the force required to pull each chisel through the soil is quite large. The addition of plow elements serves to increase the power required to move the tillage implement through the soil. These large power requirements necessitate that the user employ a high horse power tractor. However, such high horse power tractors are very expensive, driving up the cost per acre of producing the crop. The land owner may hire out the tillage operation, but this involves a cash outlay which also increases the per acre cost of the crop. Additionally, in both cases the larger horse power tractor typically consumes more fuel and produces more emissions than that of smaller horse power tractors.

SUMMARY OF THE INVENTION

An object of the present invention is to provide a tilling or field breaking implement which will adequately break a layer of hard pan compacted soil.

Another object of the present invention is to provide such an implement which will produce adequate turning of the soil.

Yet another object of the present invention is to provide such an apparatus which will allow adequate tillage and field breaking with lower horse power equipment than prior art devices.

These and other objects are achieved by a field breaking or tilling implement. The implement is mounted or located at a lower end of a shank which is adapted to be drawn behind a tractor. At the lower forward end of the shank is located a chisel point adapted to be pulled through the soil at a position just below a sub-surface hard pan soil layer. Extending rearwardly from the shank is a plow extension which mounts a plow member in spaced relation from the shank. The plow member is located directly behind the chisel, and serves to lift and break the soil. This implement is believed to produce very good tillage result, yet require less horse power to pull through the soil than prior art devices. A method of tilling is also disclosed in which a plow member is pulled through the soil directly behind a chisel member.

BRIEF DESCRIPTION OF THE DRAWINGS

The objects and features of the invention noted above are explained in more detail with reference to the drawings in which like reference numerals denote like elements, and in which:

FIG. 1 is a side view of a first embodiment of the present invention;

FIG. 2 is a front view of the device of FIG. 1;

FIG. 3 is a top view of the device of FIG. 1;

FIG. 4 is an exploded perspective view of a second embodiment of the present invention; and FIG. 5 is a top view in detail showing a plurality of the implements according to the present invention mounted upon a trailer.

DETAILED DESCRIPTION OF THE INVENTION

With reference to FIGS. 1-3, an implement according to the present invention is generally designated by reference numeral 10. The implement 10 essentially consists of an elongated support 12, a chisel point 14 and a plow member 16.

The support 12 is elongated in the direction of travel of the implement and is preferably formed of metal or other rugged material sufficient to withstand the forces to which it is subjected during use. Although the cross-sectional configuration of the support 12 is not critical, a rectangular configuration is preferred. The support 12 includes a forward end 18 and a rear end 20, intermediate of which is formed a shank slot 22. The shank slot 22 is adapted to receive the lower end of a shank 24, to which the implement 10 is mounted. While the implement may be mounted to shanks of various configurations, it is preferred that it be mounted to the standard parabolic shank, and for this reason the front and rear ends of the shank slot 22 may be angled to accept the lower end of such a shank. At least one, and possibly two or more, mounting holes 24 extend through the support 12 within the limits of the shank slot 22, and are located to be coincident with similar holes in the shank 24 when the implement is placed in the operative position. Appropriate mounting pins or bolts (not shown) may extend through the mounting holes 26 and through the holes in the shank 24 to secure the implement to the shank.

At the forward end 18 of the support the chisel point 14 is rigidly mounted. As is shown in the drawings, and as is known in the art, the chisel point 14 is a generally rectangular member having at least a substantially planar front face which forms an angle with respect to a plane normal to the direction of travel. Specifically, the chisel point 14 includes a lower end 28 and an upper end 29, with the lower end being spaced forwardly with respect to the rearward end. This angle assists in drawing the chisel point through the soil, as opposed to a blunt face.

As is best shown in FIG. 1, the lower end 28 of the chisel point preferably extends below the bottom of support 12, while the upper end 30 of the chisel point preferably extends slightly above the upper edge of the support 12. This will result in the chisel point breaking a sufficient extent of ground such that the support 12 may pass smoothly behind it. Similarly, the lateral extent of the chisel point 14 may be greater than the lateral extent of the support 12, rather than the equal extent shown best in FIG. 3. To maintain the chisel point upon the support 12 during the forces imparted by passing through the soil, the chisel point may be welded to the support. Alternatively, the chisel point 14 may be replaceable as is known in the art, and as is better described below.

Adjacent the rear end 20 of the support end 12 is mounted the plow member 16. The plow member 16 includes first and second board elements 32 and 34 which may, and preferably do, have a substantially mirror image configuration. The board elements meet at a central apex 36 which is located in a substantially vertical plane and preferably angles rearwardly, such that the lower end is forward of the upper end.

The particular configuration of the board elements, and thus the plow member 16, is not considered to be critical to the present invention. The plow member 16 may take the form of a mold board plow, a lister or other configurations. All that is believed necessary for practice of the present invention is that the plow member 16 have a general configuration which will lift and, at least to some extent, turn the soil through which it passes. This will typically require that a portion of the board elements extend downwardly and rearwardly.

The plow member 16 may be mounted to the support 12 at various vertical positions with respect to the chisel point 14. It is preferred, however, that the lower edge of the plow member 16 not extend below the lower end 28 of the chisel point. Similarly, the plow member could be spaced well above the upper end 30 of the chisel point. However, as will be apparent from the discussion of the possible theory of operation of the implement, it is preferred that the lower end of the chisel plow be at least level, and preferably slightly below, of the upper end 30 of the chisel point. Where the upper end of the chisel point extends a slight distance above the upper edge of the support 12, the plow member 16 may be advantageously mounted such that its lower edge abuts against the upper edge of the support.

As the plow member will be subjected to rearwardly directed forces as it passes through the soil, it is preferable to provide a reinforcement member 38 (FIG. 1) which extends upwardly from the support 12 just behind the apex 36 of the plow member. The plow member 16 may be welded to support 12, and additionally to the reinforcement member 38 where used, or may removably mounted, as by bolts, to the reinforcement member 38.

The placement of the plow member 16 in the direction of travel is an important aspect of the present invention. While the amount which support 12 extends rearwardly of the apex 36 is not considered critical, the spacing of the apex 36 from the rear face of the shank 24 is an important feature. Specifically, mounting the apex 36 such that it is in abutment or very close proximity to the rear face of the shank will cause the present implement to act similar to the prior art devices described in the patents noted above. It is the spacing of the apex 36 rearwardly of the shank 24 which provides a great contribution to the operation of the implement, as will be discussed below. The particular optimum spacing of the plow member from the rear of shank 24 may vary depending upon the soil conditions, the shape of plow member 16 and other factors. Through empirical testing a spacing of approximately 10 (ten) centimeters (4 inches) from the lower edge of the apex 36 to the shank 24, along the upper surface of support 12, has been found to work well.

Another important aspect of the present invention is the location of the apex directly behind, in the direction of travel, the chisel point 14 and shank 24. This arrangement is also believed to provide important contributions to the operation of the implement.

In operation the implement 10 will be mounted to the shank 24 as described above, and as shown in FIG. 1. This shank will typically be connected to a trailer assembly (described below with reference to FIG. 5) which is in turn connected by a standard hitch assembly to a tractor which will pull these elements in a direction of travel. This direction of travel will be with the chisel point foremost, or in the plane of the page and towards the left with respect to FIG. 1. The implement will be below the surface 39 (FIG. 1) of the soil during travel, with this distance being set, and possible dynamically adjusted, by known mechanisms associated with the trailer. As the implement is below the surface of the soil during travel, the support 38 (if employed) would inherently not extend upwardly beyond the surface of the soil during such travel, nor is there a separate shank for the plow member itself which extends above the surface of the soil.

The implement is preferably located within the soil at a point where at least the lower end 28 of the chisel point 14 is consistently below the lower edge of the hard pack soil. As an example, a deep tilling operation would typically place the chisel point approximately 40 centimeters (16 inches) below the surface of the soil. It is in this sub-surface position that the implement is pulled through the soil.

As the implement 10 moves through the soil the chisel point 14 will shear through the hard pack soil, and due to its angled configuration, will provide a slight lifting action, causing fracture and breakage of the hard pan. This fracture and breakage is localized, however, such that the chisel point 14 will form a channel or furrow of broken soil extending upwardly from the chisel point. The shank 24, located behind the chisel point, will pass through the channel or furrow causing minor additional fracture and breakage of the previously disturbed hard pan. Finally, the plow member 16 passes through the soil with the downward and outward tilted board elements providing a lifting and turning action serving to further break and fracture the hard pan and mix the soil thus broken.

During this operation the implement according to the present invention is believed to require less horse power to move through the soil than with equivalent prior art tillage devices. Although the exact mechanism behind this is not known, several theories are proposed.

First, it is believed that the plow member may ease the passage of the chisel point through the soil. Just forward of the chisel point 14 the soil is in compression due to the weight of the soil above. While the rear and outer edges of the plow member cause breakage of the hard pan soil, the lower central portion merely lifts the soil. The hard pan may be sufficiently cohesive and unitary that this lifting is transferred forward such that an entire hard pan segment along the length of the implement is tilted slightly upward about a fulcrum just in front of the chisel point 14. This may place the portion of the hard pan just in front of the chisel point in less compression, equilibrium or even tension. Any of these conditions will ease the passage of the chisel point through the soil compared to the full compressive force This in turn will reduce the required horse power. The placement of the plow member behind, in the direction of travel, the chisel point 14 may provide an enhanced lifting action with respect to prior art devices in which plow members are laterally offset with respect to the chisel point.

Another possible explanation is that the downwardly angled chisel point results in a rather strong downward force on the implement, such that the chisel point desires to drive deeper and deeper into the soil. This downwardly directed force is resisted by the shank 24, which receives a counter-clockwise moment. In the present invention, however, the plow member is mounted to the same support 12 and shank 24. The lifting action on the soil produced by the plow member, in a manner similar to the chisel point, produces a downward force on the plow member. This downward force would normally tend to lift the chisel point 14. This tendency to lift the chisel point may counteract some of the downward force upon the chisel point, allowing it to move forward with less horsepower required. With this balancing of forces, the desirability of spacing the plow member rearwardly of the shank becomes more apparent.

Another possibility, at least as opposed to those prior art devices in which the plow member are offset laterally with respect to the chisel points, is that the plow members break the soil only through lifting and turning, as the apex is not required to pass and break through the hard pack. The location of the plow member in alignment with the chisel point ensures that the apex of the plow member will pass through the channel or furrow of broken soil created by the chisel point and shank. As such, the plow member lifts and breaks the hard pan at the interior edges of the furrow.

The spacing of the apex 36 of the plow member rearwardly of the shank 24 is also believed to improve the soil turning action provided by the present implement. In particular, the broken hard pack may pass laterally across from one side of the implement to another within the space between the shank an apex. This is believed to provide improved soil mixing and turning.

It is again noted that the actual theory of operation behind the present implement is not fully understood. However, only one of these theories (that the downward force upon the plow member tends to move the chisel point upward) requires that the chisel point and plow member be mounted upon a single support and shank. In other words, it is possible that similar results may be achieved where a double tool bar is employed with the forward tool bar having a standard shank and chisel point, and the rear tool bar having a standard plow member, but with the plow member aligned directly behind, in the direction of travel, the forward chisel point. As such, the present invention is intended to encompass a method of tilling which may be practiced by such an apparatus.

With reference to FIG. 4, a second embodiment according to the present invention is shown. This second embodiment is generally designated by reference numeral 40, and is generally similar to the first embodiment with the major exception of the provision of a modified shank 42.

In this embodiment, the shank 42 is provided with a main body 44 having a configuration which is standard and known in the art. This configuration may be curved, parabolic, or straight as desired. The lower end of the main body 44 includes an extension 46 which extends rearwardly, in the direction of travel, to a rear end 48. The extension 46 may be formed as a monolithic element such that the extension and main body are unitary, or it may be applied by welding or removable bolts.

The forward lower end of main body 44 will be shaped in a manner known in the art to receive thereon a replaceable chisel point 14 which may include a chisel mounting bracket 50. The mounting bracket, or the chisel point 14, may be removably mounted to the lower forward end of main body 44 by the use of a bolt 52 or pin arrangement, as known in the art. Extending upwardly from the extension 46 at a position in proximity to the rear end 48 is a plow mount 54. The plow mount is preferably rigidly fixed to the extension 46 as by welding or forming these elements as a monolithic unit. Plow mount 54 includes at least one through hole 56 which will receive therethrough a plow bolt 58 after it has passed through a plow element 60. The plow element 60 may take a form similar to the plow member 16, but is removable such that plow members having different shapes may be employed with the modified shank 42. The forward face 62 of the plow mount 54 may be tapered to an apex extending in a vertical plane to more closely fit against the rear face of the plow element 60.

As may be readily seen, the use of the plow bolts 58 allows the plow element 60 to be exchanged for a different plow element having a different shape or configuration. This will allow the implement according to the present invention to provide different operating characteristics. Additionally, the modified shank 42 may be employed without the plow element 60 in place. In such a situation, the chisel point 14 will be mounted to the shank in the usual manner, and it is believed that this combination will work as with a standard shank and chisel point. This is because the extension 46 and plow mount 54 will have little drag or other effect while passing through the soil.

As with other field breaking implements, the implement according to the present invention is preferably employed as multiple units to be mounted upon a trailer pulled by a tractor. This is best shown in FIG. 5. In this FIGURE, a tool bar 64 of a typical trailer includes a plurality of standard mounting brackets 66 which may mount either a standard shank 24 or a modified shank 42 for mounting the implement 10 of the present invention. As is typical of such trailers, the tool bar 64 will additionally mount an adjustable wheel set 68 adjacent each end thereof, which may be adjusted to various configurations to set the operating depth of the implements 10. While the tool bar shown in FIG. 5 is of a standard V-shape configuration and is employed alone, the implements according to the present invention may be employed with a standard straight trailer, and additional tool bars having additional standard implements may be employed.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

What is claimed is:

1. A field breaking implement, comprising:
   a support member elongated in a direction of travel, said support member having front and rear ends;
   a chisel mounted on said front end of said support member, said chisel being adapted to break soil as said chisel moves through the soil at a distance below the surface of the soil; and
   a plow member mounted in proximity to said rear end of said support member, and therefore behind, in said direction of travel, said chisel, said plow member moving through the soil at a distance below the surface of the soil, said plow member being when in use.

2. An implement as in claim 1, wherein said chisel is removably mounted on said support member.

3. An implement as in claim 1, wherein said plow member is removably mounted on said support member.

4. An implement as in claim 3, wherein said chisel is removably mounted on said support member.

5. An implement as in claim 1, wherein said support member includes a shank slot extending therein and adapted to receive a lower end of a shank acting as a connection between said implement and a device for causing movement of said implement in said direction of travel, said slot being located intermediate of said front and rear ends.

6. An implement as in claim 5, wherein said shank slot is spaced from said plow member such that said plow member will be spaced from a rear face of the shank when the shank is received within said shank slot.

7. An implement as in claim 6, wherein said chisel is removably mounted on said support member.

8. An implement as in claim 6, wherein said plow member is removably mounted on said support member.

9. An implement as in claim 8, wherein said chisel is removably mounted on said support member.

10. An implement as in claim 1, further comprising a shank mounted on said support member and extending upwardly therefrom, said shank adapted to act as a connection between said implement and a device for causing movement of said implement in said direction of travel, said shank being mounted to said support member at a location intermediate said front and rear ends.

11. An implement as in claim 10, wherein a rear face of said shank is spaced from said plow member.

12. An implement as in claim 11, wherein said chisel is removably mounted on said support member.

13. An implement as in claim 11, wherein said plow member is removably mounted on said support member.

14. An implement as in claim 13, wherein said chisel is removably mounted on said support member.

15. A field breaking implement, comprising:
   a shank having a top end adapted to be connected to a device for moving said shank in a direction of travel, and a bottom end adapted to be inserted below the surface of the earth such that a portion of said shank passes through the soil when moved in said direction of travel; and
   an extension mounted in proximity to said bottom end of said shank and extending rearwardly along said direction of travel;
   a chisel mounted on said shank in proximity to said bottom end at a forward end of said shank, said chisel being adapted to break soil as said chisel moves through the soil at a distance below the surface of the soil;
   a plow member mounted in proximity to said rear end of said extension, and therefore behind, in said direction of travel, said chisel, said plow member moving through the soil at a distance below the surface of the soil, said plow member being solely supported by said support member and having no shank extending upwardly beyond said plow member a distance sufficient to extend above the surface of the soil when in use.

16. A method of breaking fields, comprising the steps of:
   providing a shank member having a top end adapted to be connected to a device for moving said shank in a direction of travel, and a bottom end adapted to be inserted below the surface of the earth such that a portion of said shank passes through the soil when moved in said direction of travel;
   providing a chisel mounted on said shank in proximity to said bottom end at a forward end of said shank, said chisel being adapted to break soil as said chisel moves through the soil at a distance below the surface of the soil:
   providing a plow member adapted to at least lift soil;
   placing said bottom end of said shank, and therefore said chisel, below the surface of the soil, and placing said plow member entirely below the surface of the soil, said plow member being spaced rearwardly, along said direction of travel, from a rear face of said shank and being substantially aligned, in said direction of travel, with said chisel, said plow member having no shank extending upwardly beyond said plow member a distance sufficient to extend above the surface of the soil when in use; and
   moving both said shank and said plow member through the soil in said direction of travel.

17. A method as in claim 16, wherein said step of providing said plow member further includes mounting said plow member to said shank member.

* * * * *